I. HOLMES.
Cultivating Hops.
No. 57,905
Patented Sept 11, 1866.
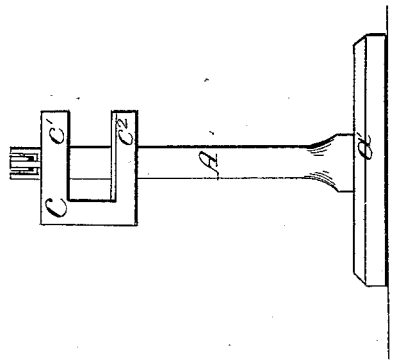
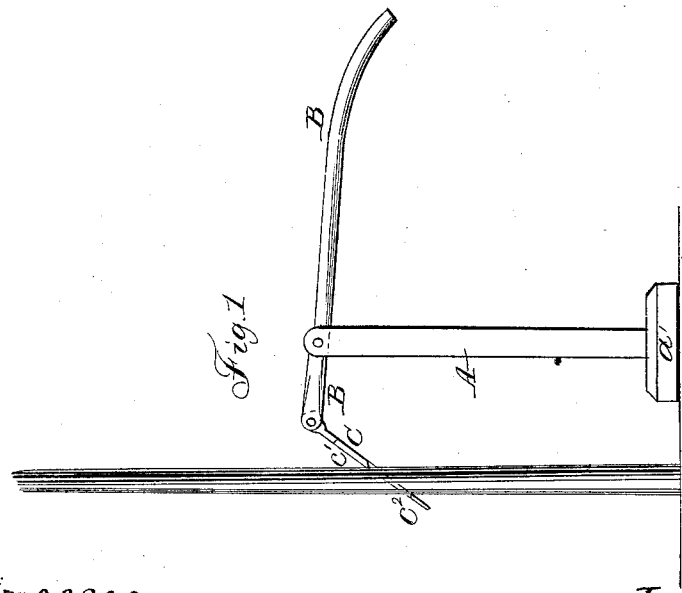
Witnesses.
Jas A Service
J W B Covington
Inventor
Ira Holmes
Per Munn & Co
Atty's

UNITED STATES PATENT OFFICE.

IRA HOLMES, OF SOUTH NEW BERLIN, NEW YORK.

IMPROVEMENT IN POLE AND POST PULLERS.

Specification forming part of Letters Patent No. 57,905, dated September 11, 1866.

*To all whom it may concern:*

Be it known that I, IRA HOLMES, of South New Berlin, in the county of Chenango and State of New York, have invented a new and useful Improvement in Self-Adjusting Pole and Post Pullers; and I do hereby declare that the following is a full, clear, and exact description thereof, which will enable others skilled in the art to make and use the same, reference being had to the accompanying drawings, forming part of this specification, in which—

Figure 1 is a side view of my improved pole and post puller, and showing in red a pole in position to be pulled. Fig. 2 is a front view of the same.

My invention has for its object to furnish an improved instrument for pulling hop or other poles or posts out of the ground quickly and easily; and it consists of an instrument formed by combining a standard, lever, and hook with each other, as hereinafter more fully described.

A is the standard, the lower end of which terminates in a foot or foundation, $a'$, of sufficient breadth to prevent the said lower end of the instrument from sinking into the ground when being used.

To the top of the standard A is pivoted a lever, B, which is of such a length as to be conveniently used, and the pivoting point or fulcrum must be at such a distance from the forward end of the said lever as will at the same time allow the said forward end of the lever sufficient movement to raise the pole and sufficient power to pull it.

The lifting-hook C is made in the form of three sides of a hollow square, as shown in Fig. 2, and said hook is pivoted to the end of the lever at about the middle point of one of its sides.

The inner edges of both the upper and lower horizontal arms, $c'$ and $c^2$, of the hook C are beveled in opposite directions, as shown in Fig. 1, so as to take hold of the pole without slipping and raise it from the ground.

By the use of this instrument hop-poles can be raised from the ground very rapidly and with very great ease, thereby saving a great expense in harvesting the hops.

In using the instrument it is carried from one pole to another in the hand. When approaching a pole the foot $a'$ is brought to the ground with a swinging side motion, which throws the hook C around the pole, and it drops into the position shown in Fig. 1. Then, by depressing the free end of the lever B, the pole is pulled from the ground.

Having thus described my invention, what I claim as new, and desire to secure by Letters Patent, is—

An improved self-adjusting pole and post puller formed by combining the hook C, constructed, as described, with the lever B and standards A, substantially as and for the purpose set forth.

The above specification of my invention signed by me this 11th day of April, 1866.

IRA HOLMES.

Witnesses:
M. M. LIVINGSTON,
ALEX. F. ROBERTS.